(12) United States Patent
Lang

(10) Patent No.: US 9,643,548 B2
(45) Date of Patent: May 9, 2017

(54) SYSTEM AND METHOD FOR DETECTING AND PROVIDING POWER TO AN ACCESSORY IN A VEHICLE

(71) Applicant: Christopher Lang, Dublin, OH (US)

(72) Inventor: Christopher Lang, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 734 days.

(21) Appl. No.: 13/910,487

(22) Filed: Jun. 5, 2013

(65) Prior Publication Data

US 2014/0361609 A1    Dec. 11, 2014

(51) Int. Cl.
    *B60R 16/03*    (2006.01)
(52) U.S. Cl.
    CPC .................. *B60R 16/03* (2013.01)
(58) Field of Classification Search
    CPC ..................................... B60R 16/03
    USPC ........................................... 307/9.1
    See application file for complete search history.

(56) References Cited

U.S. PATENT DOCUMENTS

| | | | |
|---|---|---|---|
| 4,733,100 A | | 3/1988 | Nusairat et al. |
| 5,204,991 A | | 4/1993 | Law |
| 5,355,273 A | * | 10/1994 | Yoshizawa .......... B60R 16/0239 361/105 |
| 5,844,472 A | * | 12/1998 | Lee ........................ B60R 11/02 320/111 |
| 7,129,598 B2 | * | 10/2006 | Wagner ................. H02J 7/0031 307/10.7 |
| 2004/0001292 A1 | * | 1/2004 | Vanderkolk ............ H02H 3/33 361/42 |
| 2004/0107972 A1 | * | 6/2004 | Sheen .................. B60Q 3/0236 131/329 |
| 2005/0083190 A1 | * | 4/2005 | James .................... G08B 21/24 340/457 |
| 2007/0075153 A1 | * | 4/2007 | Blanchard ............... H02J 5/005 237/12.3 A |
| 2008/0004081 A1 | * | 1/2008 | Rutkowski ............. H04B 1/034 455/565 |
| 2009/0001938 A1 | * | 1/2009 | Vantu .................... H02J 7/0036 320/165 |
| 2010/0133900 A1 | * | 6/2010 | King ................... B60L 11/1816 307/9.1 |

FOREIGN PATENT DOCUMENTS

KR    20120010498    2/2012

* cited by examiner

*Primary Examiner* — Jared Fureman
*Assistant Examiner* — Emmanuel R Dominique
(74) *Attorney, Agent, or Firm* — Armstrong Teasdale LLP

(57) ABSTRACT

An electrical system for providing power to an accessory in a vehicle is provided. The electrical system includes a power source, a relay coupled to the power source, an accessory socket coupled to the relay, and a switch coupled to the relay and disposed at least partially within the accessory socket. The accessory socket is configured such that the switch is in a closed state when an accessory is coupled to the accessory socket and the switch is in an open state when the accessory is not coupled to the accessory socket. When the switch is in the closed state, the relay consumes power from the power source and when the switch is in the open state, the relay does not consume power from the power source.

18 Claims, 3 Drawing Sheets

SYSTEM AND METHOD FOR DETECTING AND PROVIDING POWER TO AN ACCESSORY IN A VEHICLE

BACKGROUND OF THE INVENTION

The field of the invention relates generally to vehicles, and more particularly, to systems and methods for providing power to an accessory in a vehicle.

In at least some known vehicles, a relay is coupled between a battery and an accessory socket. The relay is energized when the vehicle is turned on. When the relay is energized, the accessory socket is powered. Conversely, when the vehicle is turned off, the relay is not energized and the accessory socket is not powered. Such a configuration prevents unwanted discharge of the battery when an accessory is plugged into the accessory socket and the vehicle is turned off. However, when the vehicle is turned on or running, the relay consumes power regardless of whether an accessory is plugged into the accessory socket or not.

Providing electrical power to electrical components within a vehicle consumes energy that is indirectly supplied by fuel in a fuel tank of the vehicle. Accordingly, providing power to a relay in a vehicle accessory socket when no accessory is plugged in consumes energy that could otherwise be used by the vehicle to travel.

BRIEF DESCRIPTION OF THE INVENTION

In one aspect, an electrical system for providing power to an accessory in a vehicle is provided. The electrical system includes a power source, a relay coupled to the power source, an accessory socket coupled to the relay, and a switch coupled to the relay and disposed at least partially within the accessory socket. The accessory socket is configured such that the switch is in a closed state when an accessory is coupled to the accessory socket and the switch is in an open state when the accessory is not coupled to the accessory socket. When the switch is in the closed state, the relay consumes power from the power source and when the switch is in the open state, the relay does not consume power from the power source.

In another aspect, a vehicle is provided. The vehicle includes an electrical system including a power source, a relay coupled to the power source, an accessory socket coupled to the relay, a switch coupled to the relay and disposed at least partially within the accessory socket. The switch and the accessory socket are configured such that the switch is in a closed state when an accessory is coupled to the accessory socket and the switch is in an open state when the accessory is not coupled to the accessory socket. When the switch is in the closed state, the relay consumes power from the power source and when the switch is in the open state, the relay does not consume power from the power source.

In another aspect, a method for reducing electrical loads on a power source of a vehicle is provided. The method includes providing an accessory socket configured to receive an accessory and couple the accessory to the power source of the vehicle through a relay. The method also includes configuring a switching device to close when the accessory is coupled to the accessory socket, wherein power only flows from the power source and the relay when the switching device is closed.

DETAILED DESCRIPTION OF THE INVENTION

Figure 1:
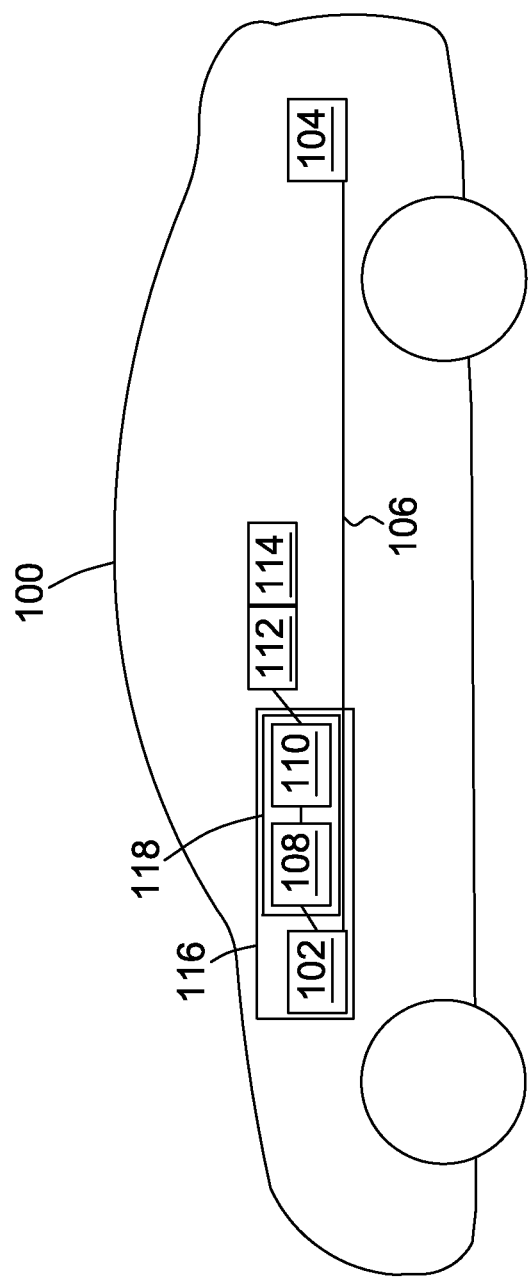
FIG. 1 is a schematic diagram of an exemplary vehicle containing an exemplary accessory socket.

FIG. 1 is a schematic diagram of an exemplary vehicle 100. Vehicle 100 includes an engine 102 that is coupled to a fuel tank 104 via fuel line 106. Engine 102 is coupled to an alternator 108. Alternator 108 is electrically coupled to energy storage device 110, and energy storage device 110 is electrically coupled to an accessory socket 112. An accessory 114 is coupled to accessory socket 112. More specifically, accessory 114 is plugged into accessory socket 112 and receives power therefrom. Engine 102 receives fuel, for example gasoline or diesel, from fuel tank 104 via fuel line 106. Engine 102 generates mechanical power from the fuel to enable vehicle 100 to travel and to provide power to alternator 108. Alternator 108 generates electricity that is stored in energy storage device 110. Energy storage device 110 may be, for example, a battery and/or a capacitor.

Engine 102, alternator 108, and energy storage device 110 are components of a power source 116 of vehicle 100. In particular, alternator 108 and energy storage device 110 are components of an electrical power source 118 of vehicle 100. Accordingly, as one or more components in vehicle 100 consume electrical power from electrical power source 118, stored energy in energy storage device 110 is depleted. In other implementations, vehicle 100 may be a hybrid electric vehicle (HEV) or an electric vehicle (EV) and vehicle 100 may include additional, fewer, or different components accordingly.

Figure 2:
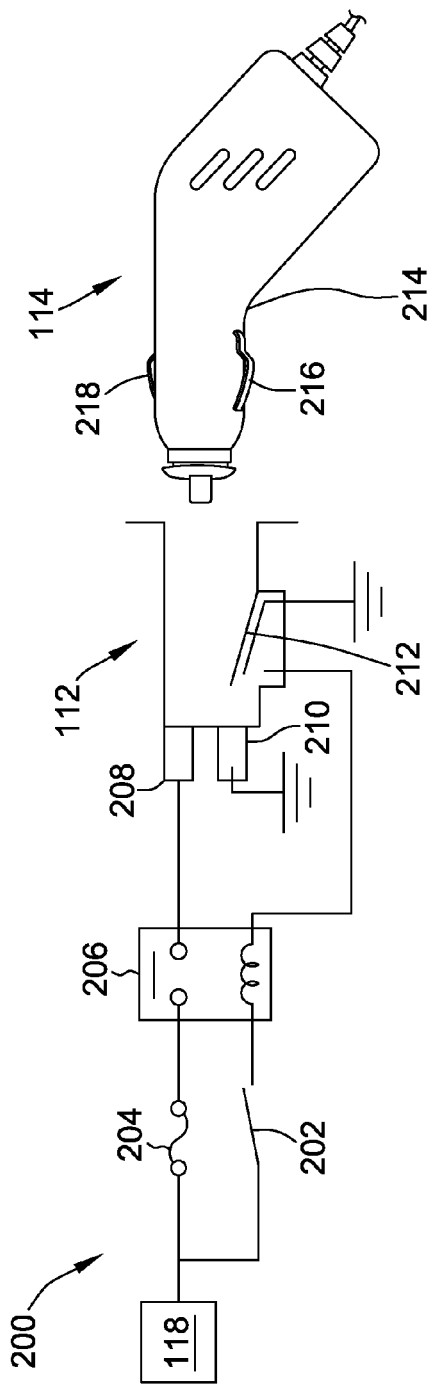
FIG. 2 is a schematic diagram of an exemplary electrical system including the exemplary accessory socket of FIG. 1.
Figure 3:
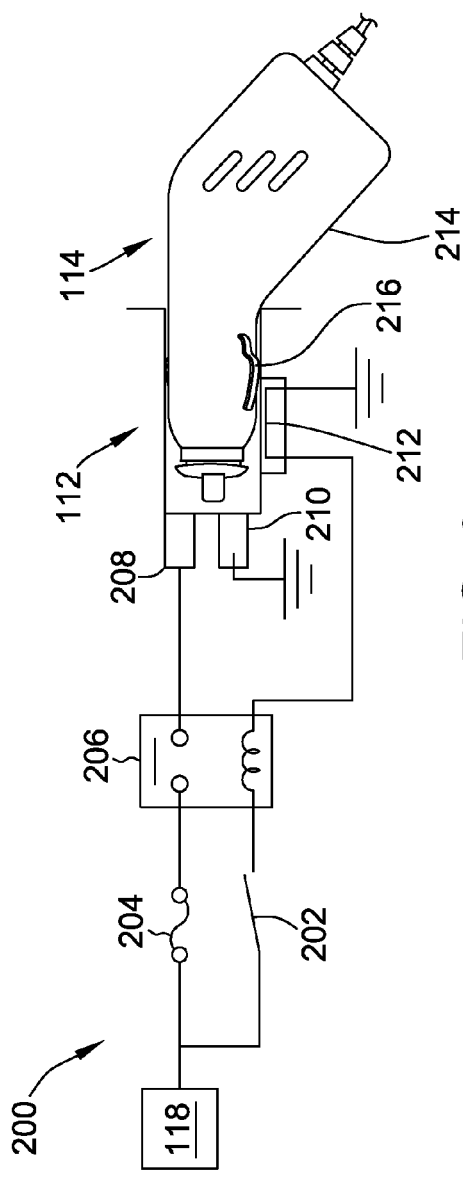
FIG. 3 is a schematic diagram of an exemplary electrical system including the exemplary accessory socket of FIG. 1.

FIGS. 2 and 3 are schematic diagrams of an exemplary electrical system 200 that includes accessory socket 112. Electrical system 200 may be included in vehicle 100 (shown in FIG. 1). Electrical power source 118 is electrically coupled to an ignition switch 202 and a circuit protection device 204. Circuit protection device 204 may include, but is not limited to, a fuse. Ignition switch 202 and fuse 204 are coupled to a relay 206. Relay 206 provides electrical isolation between electrical power source 118 and accessory socket 112. For example, if a short circuit occurs in accessory socket 112, relay 206 prevents the short circuit from affecting electrical power source 118. Relay 206 is coupled to a first terminal 208 of accessory socket 112 and to a switch 212 of accessory socket 112. Switch 212 is any switching device that physically completes a circuit. For example, in some embodiments, switch 212 completes a circuit through magnetism, in addition to or as an alternative to, mechanical force. Accessory socket 112 includes a second terminal 210 that is coupled to ground and switch 212. Switch 212 is also coupled to ground. When ignition switch 202 is closed, fuse 204 is intact, and switch 212 is closed, current flows from electrical power source 118, through relay 206, to accessory socket 112 and accessory 114.

In the exemplary embodiment, switch 212 is biased open, for example by a spring (not shown), such that when accessory 114 is not plugged into accessory socket 112, no current flows through relay 206. When accessory 114 is plugged into accessory socket 112, switch 212 is closed and current flows from electrical power source 118, through relay 206 to accessory socket 112 and accessory 114.

In the exemplary embodiment, accessory 114 includes a body 214, which includes a first contact portion 216 and a second contact portion 218. Contact portions 216 and 218 are electrically conductive. When body 214 of accessory 114 is inserted at least partially into accessory socket 112, contact portion 216 moves switch 212 from an open state to a closed state. When accessory 114 is removed from accessory socket 112, switch 212 reverts back to an open state. Accordingly, power is provided from electrical power source 118 to relay 206, accessory socket 112, and accessory 114 when accessory 114 is plugged into accessory socket 112. Without a switch, for example switch 212, to open and close a circuit on an accessory side of relay 206 depending on whether the accessory was coupled to accessory socket 112, relay 206 would consume power from electrical power source 118 regardless of whether accessory 114 was coupled to accessory socket 112 or not.

Figure 4:
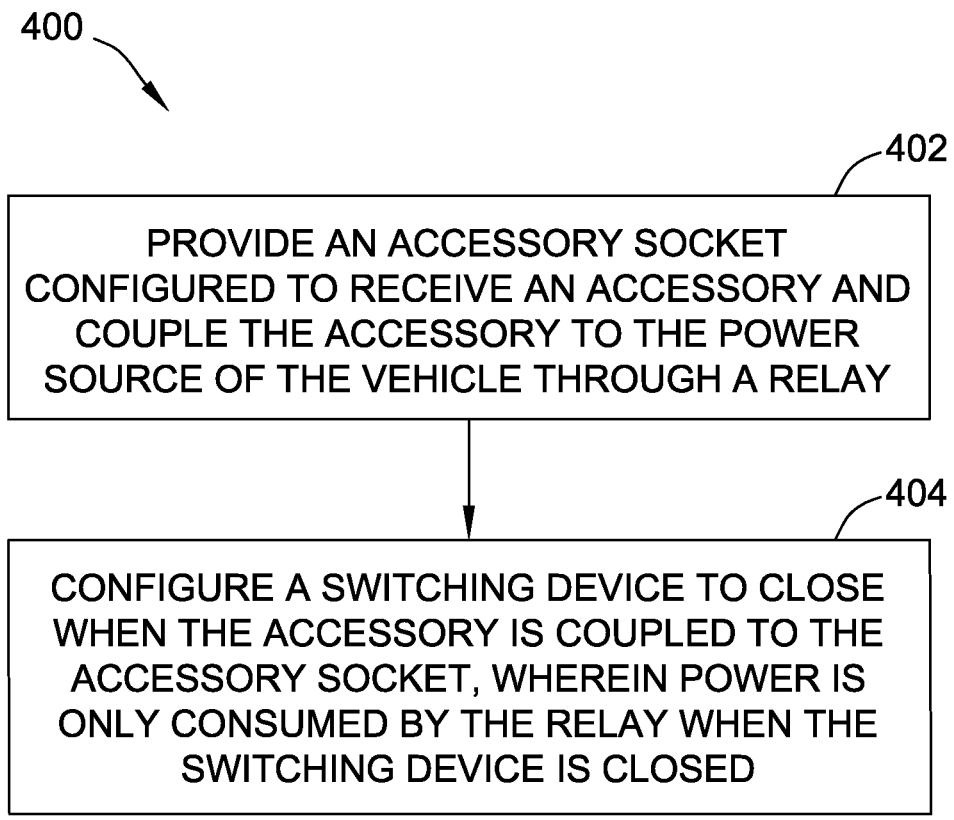
FIG. 4 is a flowchart of an exemplary process that may be implemented to reduce electrical loads on a power source of the vehicle of FIG. 1.

FIG. 4 is a flowchart of an exemplary process 400 to reduce electrical loads on a power source of a vehicle, for example, electrical power source 118 of vehicle 100 (shown in FIG. 1). Method 400 includes providing 402 an accessory socket, for example, accessory socket 112 (shown in FIGS. 2 and 3). Accessory socket 112 is configured to receive an accessory, for example, accessory 114 (shown in FIGS. 2 and 3) and to couple accessory 114 to power source 118 through a relay, for example, relay 206 (shown in FIGS. 2 and 3). Method 400 additionally includes configuring 404 a switching device, for example switch 212 (shown in FIGS. 2 and 3), to close when accessory 114 is coupled to accessory socket 112, wherein power is only consumed by relay 206 when the switching device 212 is closed. In other words, switching device 212 is configured such that relay 206 is only energized when accessory 114 is coupled to accessory socket 112. Switching device 212 may be configured such that it is at least partially disposed within accessory socket 112. Additionally, switching device 212 may be configured such that it is biased open and is physically closed by body 214 of accessory 114, when accessory 114 is inserted or otherwise coupled to accessory socket 112. Additionally, ignition switch 202 may be provided and configured to prevent current from flowing from power source 118 to relay 206 when ignition switch 202 is open (i.e., when vehicle 100 is turned off). Accordingly, in the exemplary embodiment, relay 206 is energized (i.e., consuming power) only when ignition switch 202 and switching device 212 are closed.

As compared to known systems and methods for providing power to an accessory in a vehicle, the systems and methods described herein provide electrical isolation from a power source of a vehicle with a relay while preventing the relay from consuming power when an accessory is not plugged into a corresponding accessory socket. Accordingly, vehicles equipped and operated in accordance with the systems and methods described herein may provide more reliable and safe provisioning of power to a vehicle accessory, while also preserving energy that would otherwise be consumed when the accessory is not coupled to a vehicle accessory socket.

Exemplary embodiments of systems and methods for providing power to a vehicle accessory are described above in detail. The systems and methods described herein are not limited to the specific embodiments described herein, but rather, components of the systems and/or steps of the methods may be utilized independently and separately from other components and/or steps described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electrical system for providing power to an accessory in a vehicle, comprising:
   a power source;
   a relay coupled to said power source;
   an accessory socket comprising a power terminal and a ground terminal, said power terminal coupled to said relay; and
   a switch coupled to said relay and said ground terminal, and disposed at least partially within said accessory socket,
   wherein said accessory socket is configured such that said switch is in a closed state when an accessory is coupled to said accessory socket and said switch is in an open state when the accessory is not coupled to said accessory socket, and
   wherein when said switch is in the closed state, said relay is coupled to said ground terminal and consumes power from said power source, and when said switch is in the open state, said relay is decoupled from said ground terminal and does not consume power from said power source.

2. The electrical system of claim 1, wherein when said switch is in the closed state, said accessory socket provides power to the accessory and when said switch is in the open state, said accessory socket does not provide power to the accessory.

3. The electrical system of claim 1, wherein said power source comprises an electrical power source.

4. The electrical system of claim 1, wherein said power source comprises a battery.

5. The electrical system of claim 1, further comprising a fuse coupled between said power source and said relay.

6. The electrical system of claim 1, further comprising an ignition switch coupled between said power source and said relay.

7. The electrical system of claim 1, wherein the accessory comprises a body and wherein said switch is biased towards the open state and is physically moved to the closed state by the body of the accessory when the accessory is coupled to said accessory socket.

8. The electrical system of claim 7, wherein said switch is physically moved to the closed state by the body of the accessory when the accessory is plugged into said accessory socket.

9. The electrical system of claim 1, wherein said switch is configured to engage with an electrically conductive contact portion of the accessory.

10. An accessory socket for removably coupling an electrical accessory to a vehicle power source, said accessory socket comprising:
    a power terminal configured to be coupled to a relay, the relay configured to allow current to flow from the vehicle power source to the accessory socket when energized;
    a ground terminal; and
    a switching device configured to be coupled to the relay and said ground terminal, said switching device is biased to a first state and configured to transition to a second state when an accessory is coupled to said accessory socket, said switching device further configured to couple the relay to said ground terminal and energize the relay only when the switching device is in the second state.

11. The accessory socket of claim 10, wherein the first state is an open state and the second state is a closed state.

12. The accessory socket of claim 10, wherein said switching device is further configured to be physically moved to the second state by a body of the accessory when the accessory is at least partially inserted into said accessory socket.

13. The accessory socket of claim 10, wherein said switching device is further configured to be moved from the first state to the second state by mechanical force.

14. The accessory socket of claim 10, wherein said switching device is further configured to be moved from the first state to the second state by an electrically conductive contact portion of the accessory.

15. A method for reducing electrical loads on a power source of a vehicle comprising:

providing an accessory socket having a power terminal and a ground terminal, the accessor socket configured to receive an accessory and couple the accessory to the power source of the vehicle through a relay; and configuring a switching device coupled to the ground terminal to close when the accessory is coupled to the accessory socket, wherein closing the switching device couples the ground terminal to the relay, and wherein power is only consumed by the relay when the switching device is closed.

16. The method of claim 15, wherein configuring the switching device further comprises disposing the switching device at least partially within the accessory socket.

17. The method of claim 15, wherein configuring the switching device further comprises configuring the switching device to be biased open and to be physically closed by a body of the accessory when the accessory is coupled to the accessory socket.

18. The method of claim 15, further comprising providing an ignition switch and configuring the ignition switch to prevent current from flowing from the power source and the relay when the ignition switch is open.

* * * * *